(12) United States Patent
Mitomo et al.

(10) Patent No.: US 6,632,379 B2
(45) Date of Patent: Oct. 14, 2003

(54) OXYNITRIDE PHOSPHOR ACTIVATED BY A RARE EARTH ELEMENT, AND SIALON TYPE PHOSPHOR

(75) Inventors: Mamoru Mitomo, Tsukba (JP); Tadashi Endo, Sendai (JP); Kyouta Ueda, Sendai (JP); Masakazu Komatsu, Sendai (JP)

(73) Assignee: National Institute for Materials Science, Tsukuba (JP)

( * ) Notice: Subject to any disclaimer, the term of this patent is extended or adjusted under 35 U.S.C. 154(b) by 0 days.

(21) Appl. No.: 10/162,614

(22) Filed: Jun. 6, 2002

(65) Prior Publication Data

US 2003/0030038 A1 Feb. 13, 2003

(30) Foreign Application Priority Data

Jun. 7, 2001 (JP) ........................................ 2001-171831
May 23, 2002 (JP) ........................................ 2002-149022

(51) Int. Cl.[7] .................. H01L 33/00; C09K 11/64; C03C 3/11

(52) U.S. Cl. .................. 252/301.4 R; 252/301.4 R; 252/301.68; 252/516; 252/521.1; 252/521.3; 501/92; 501/96.5; 501/98.1; 423/353; 250/484.4; 313/501

(58) Field of Search ............... 252/516, 521.1, 252/521.3, 301.4 R, 301.6 F; 423/353; 501/92, 96.5, 98.1; 250/484.4; 313/501

(56) References Cited

U.S. PATENT DOCUMENTS

2003/0030368 A1 * 2/2003 Ellens et al. ............. 313/503
2003/0052595 A1 * 3/2003 Ellens et al. ............. 313/501

FOREIGN PATENT DOCUMENTS

| JP | 60-206889 | 10/1985 | | |
|---|---|---|---|---|
| JP | 2001-214162 | 8/2001 | | |
| JP | 2002033521 | * | 1/2002 | ........... H01L/33/00 |
| NL | 155047 | * | 9/1985 | ........... C09K/11/78 |

OTHER PUBLICATIONS

J. W. H. van Krevel, "On Rare–Earth doped M–Si–Al–O–N Materials, luminiscence properties and oxidation resistance", TU Eindhoven, (2000), Chapter–11.*
G. P. Dubrovskii, et al., Inorganic Materials, vol. 17, No. 8, pp. 1059–1063, "Luminescence of Rare Earth Activated $MgSiN_2$", Aug. 1981.
T. Endo, et al., New Funtionality Materials, vol. C, pp. 107–112, "High Pressure Synthesis of "Periodic Compound" and its Optical and Electrical Properties", 1993.
S. S. Lee, et al., Proc. SPIE–Int. Soc. Opt. Eng., vol. 3241, pp. 75–79, "Photoluminescence and Electroluminescence Characteristics of $CaSiN_2$: Eu Phosphor", 1997.
J. W. H. Van Krevel , et al., Journal of Alloys and Compounds, vol. 268, pp. 272–277, "Long Wavelength $Ce^{3+}$ Emission in Y–Si–O–N Materials", 1998.
H. T. Hintzen, el al., Journal of Solid State Chemistry, vol. 142, pp. 48–50, "On the Existence of Europium Aluminum Oxynitrides with a Magnetoplumbite or β–Alumina Type Structure", 1999.
S. R. Jansen, et al., Journal of the Electrochemical Society, vol. 146, No. 2, pp. 800–806, "Eu–Doped Barium Aluminum Oxynitride with the β–Alumina–Type Structure as New Blue–Emitting Phosphor", 1999.

* cited by examiner

*Primary Examiner*—Mark Kopec
*Assistant Examiner*—Kallambella Vijayakumar
(74) *Attorney, Agent, or Firm*—Oblon, Spivak, McClelland, Maier, P.C.

(57) ABSTRACT

A sialon type phosphor in the form of a powder comprising at least 40 wt % of α-sialon represented by the formula $(Ca_x, M_y)(Si,Al)_{12}(O,N)_{16}$ (where M is at least one metal selected from the group consisting of Eu, Tb, Yb and Er, $0.05<(x+y)<0.3$, $0.02<x<0.27$ and $0.03<y<0.3$) and having a structure such that Ca sites of Ca-α-sialon are partially substituted by other metal M, at most 40 wt % of β-sialon, and at most 30 wt % of unreacted silicon nitride.

2 Claims, 9 Drawing Sheets

OXYNITRIDE PHOSPHOR ACTIVATED BY A RARE EARTH ELEMENT, AND SIALON TYPE PHOSPHOR

The present invention relates to an oxynitride phosphor activated by a rare earth element, which makes high luminance of a white light emitting diode (white LED) employing a blue light emitting diode (blue LED) as a light source possible. Further, the present invention relates to a sialon type phosphor optically activated by a rare earth element, which makes high luminance of white LED employing blue LED or an ultraviolet emitting diode (ultraviolet LED) as a light source possible.

Phosphors are widely known wherein a silicate, a phosphate (such as apatite) or an aluminate is used as a matrix material and such a matrix material is activated by a transition metal or a rare earth metal. On the other hand, phosphors wherein a nitride or an oxynitride is used as a matrix material and such a matrix material is activated by a transition metal or a rare earth metal, are not well known.

With respect to nitride phosphors, for example, German Patent 789,890 discloses aluminum nitride activated by manganese, and a literature "Izv. Akad. Nauk SSSR, Neorg. Master" 17(8), 1431–5 (1981) discloses magnesium silicon nitride ($MgSiN_2$) activated by a rare earth element. Recently, only a red-emitting phosphor having $ZnSiN_2$ having a distorted wurtzite structure activated by Mn (T. Endo et al. "High pressure synthesis of "periodic compound" and its optical and electrical properties", In T. Tsumura, M. Doyama and Seno (Editors), New Functionality Materials, Volume C, Elsevier, Amsterdam, The Netherlands, pp. 107–112 (1993)), a red-emitting phosphor having $CaSiN_2$ activated by Eu (S. S. Lee et al. "Photoluminescence and Electroluminescence Characteristic of $CaSiN_2$:Eu", Proc. SPIE-Int. Soc. Opt. Eng., 3241, 75–83 (1997)) and a phosphor having $Ba_2Si_5N_8$ activated by Eu, have been reported.

With respect to oxynitride phosphors, a phosphor using β-sialon as the matrix material (JP-A-60-206889), a phosphor having a silicate mineral or a Y—Si—O—N type composite silicon oxynitride having an apatite structure activated by Ce (J. W. H. van Krevel et al. "Long wavelength $Ce^{3+}$ emission in Y—Si—O—N materials", J. Alloys and Compounds, 268, 272–277 (1998)), a $Ba_{1-x}Eu_xAl_{11}O1_6N$ phosphor having a β-alumina structure (H. Hintzen et al. "On the Existence of Europium Aluminum Oxynitrides with a Magnetoplumbite or β-Alumina-Type Structure", J. Solid State Chem., 142, 48–50 (1999), and S. R. Jansen et al. "Eu-Doped Barium Aluminum Oxynitride with β-Alumina-Type Structure as New Blue-Emitting Phosphor", J. Electrochem. Soc., 146, 800–806 (1999)) have been reported. Recently, only a phosphor using an oxynitride glass as a matrix material, has been proposed (JP-A-2001-214162).

Whereas, white LED has been used, for example, in the field where reliability is required for e.g. emergency illumination or signal light, in the field where miniaturization and weight reduction are desired, for example, for in-vehicle lightening or liquid crystal backlight, or in the field where visibility is required for e.g. guide plates at railway stations. The emitted color of such white LED, i.e. white light, is obtained by color mixing of lights and is one obtained by mixing of blue light emitted by blue LED of InGaN type with a wavelength of from 450 to 550 nm as a light source and yellow light emitted from the phosphor.

As a phosphor suitable for such white LED, a phosphor having Ce doped to a YAG type oxide represented by the composition formula $(Y,Gd)_3(Al,Ga)_5O_{12}$, is most commonly employed. This phosphor is applied as a thin coating on the surface of the above-mentioned InGaN type blue LED as a light source.

However, an oxide type phosphor usually has a drawback that the emission intensity substantially decreases if the excitation wavelength exceeds 400 nm. Accordingly, white LED obtained by coating the surface of a blue LED chip with a phosphor made of a YAG type oxide, has been considered to have a difficulty such that the excitation energy of the YAG type oxide as the phosphor does not agree to the excitation energy of the blue LED as the light source, whereby the excitation energy can not efficiently be converted, and it is difficult to prepare white LED having high luminance.

In a first aspect, the present invention has been made in view of the above circumstances, and it is an object of the present invention to provide an oxynitride phosphor activated by a rare earth element, which makes high luminance of a white light emitting diode (white LED) employing a blue light emitting diode (blue LED) as a light source possible.

The inventors of the present invention have found that the positions of excitation/emission peaks shown by a conventional oxide type phosphor shift towards a long wavelength side, when oxygen atoms surrounding the rare earth element as the emission center are substituted by nitrogen atoms to reduce the influence which electrons of the rare earth element receive from the surrounding atoms, and on the basis of this technical finding, they have proposed a phosphor which employs an oxynitride glass as the matrix material and which has an excitation spectrum extending to a visible region ($\leq 500$ μm).

On the basis of the above technical finding, the present inventors have further studied the presence of another oxynitride phosphor and as a result, have found that a crystalline oxynitride phosphor employing α-sialon having a higher nitrogen content than the oxynitride glass, as the matrix material, wherein a part or all of metal Me (where Me is at least one metal selected from the group consisting of Ca, Mg, Y and lanthanide metals excluding La and Ce) in α-sialon solid solution as the matrix material, is substituted by lanthanide metal Re1 (Re1 is at least one metal selected from the group consisting of Ce, Pr, Eu, Tb, Yb and Eu), or two lanthanide metals Re1 and a coactivator Re2 (where Re2 is Dy), to be an emission center, makes high luminance white LED possible. Thus, the first aspect of the present invention has been accomplished on the basis of this discovery.

Thus, according to the first aspect, the present invention provides:

1. An oxynitride phosphor activated by a rare earth element, represented by the formula $Me_xSi_{12-(m+n)}Al_{(m+n)}O_nN_{16-n}:Re1_y Re2_x$, wherein a part or all of metal Me (where Me is at least one metal selected from the group consisting of Ca, Mg, Y and lanthanide metals excluding La and Ce) in α-sialon solid solution, is substituted by lanthanide metal Re1 (where Re1 is at least one metal selected from the group consisting of Ce, Pr, Eu, Tb, Yb and Er), or two lanthanide metals Re1 and a coactivator Re2 (where Re2 is Dy), to be an emission center.

2. The oxynitride phosphor activated by a rare earth element according to Item 1, wherein when metal Me is bivalent, $0.6<m<3.0$ and $0\leq n<1.5$.

3. The oxynitride phosphor activated by a rare earth element according to Item 1, wherein when metal Me is trivalent, $0.9<m<4.5$ and $0<n\leq 1.5$.

4. The oxynitride phosphor activated by a rare earth element according to any one of Items 1 to 3, wherein m=1.5, n=0.75 and in the composition formula $Me_xSi_{9.75}Al_{2.25}O_{0.75}N_{15.25}{:}Re1_y^{Re}2_z$, $0.3 < x+y < 0.75$ and $0.01 < y+z < 0.7$ (where $y > 0.01$ and $0.0 \leq z < 0.1$).

5. The oxynitride phosphor activated by a rare earth element according to Item 4, wherein $0.3 < x+y+z < 1.5$, $0.01 < y < 0.7$ and $0 \leq z < 0.1$.

6. The oxynitride phosphor activated by a rare earth element according to Item 2, 4 or 5, wherein metal Me is Ca.

The above oxynitride phosphor is composed of a single phase of α-sialon, whereby it is required to incorporate a large amount of the rare earth metal, which limits reduction of costs.

In a second aspect, the present invention has been made under such circumstances, and it is another object of the present invention to provide a sialon type phosphor comprising α-sialon dissolving a rare earth element in the structure, β-sialon and unreacted silicon nitride, which makes high luminance of a white light emitting diode (white LED) employing a blue light emitting diode (blue LED) as a light source possible.

Thus, in the second aspect, the present invention provides:

7. A sialon type phosphor in the form of a powder comprising at least 40 wt % of α-sialon represented by the formula $(Ca_x,M_y)(Si,Al)_{12}(O,N)_{16}$ (where M is at least one metal selected from the group consisting of Eu, Tb, Yb and Er, $0.05 < (x+y) < 0.3$, $0.02 < x < 0.27$ and $0.03 < y < 0.3$) and having a structure such that Ca sites of Ca-α-sialon are partially substituted by other metal M, at most 40 wt % of β-sialon, and at most 30 wt % of unreacted silicon nitride.

8. The sialon type phosphor according to Item 7, wherein the chemical composition of the powder as a whole, is within a range defined by three compositional lines of $Si_3N_4$-a($M_2O_3 \cdot 9AlN$), $Si_3N_4$-b($CaO \cdot 3AlN$) and $Si_3N_4$-c($AlN \cdot Al_2O_3$), where $4 \times 10^{-3} < a < 4 \times 10^{-2}$, $8 \times 10^{-3} < b < 8 \times 10^{-2}$ and $10^{-2} < c < 10^{-1}$.

In the accompanying drawings.

Now, the present invention will be described in detail with reference to the preferred embodiments.

The oxynitride phosphor activated by a rare earth element according to the first aspect of the present invention, is represented by the formula $Me_xSi_{12-(m+n)}Al_{(m+n)}O_n N_{16-n}{:}Re1_yRe2_x$, wherein a part or all of metal Me (where Me is at least one metal selected from the group consisting of Ca, Mg, Y and lanthanide metals excluding La and Ce) in α-sialon solid solution, is substituted by lanthanide metal Re1 (where Re1 is at least one metal selected from the group consisting of Ce, Pr, Eu, Tb, Yb and Er), or two lanthanide metals Re1 and a coactivator Re2 (where Re2 is Dy), to be an emission center, as mentioned above.

In the oxynitride phosphor activated by a rare earth element of the present invention, metal Me is dissolved in an amount of from the minimum of 1 atom per 3 unit cells to the maximum of 1 atom per 1 unit cell, of α-sialon containing 4 formula of $(Si,Al)_3(N,O)_4$. The solid solubility limits are usually such that when, in the above formula, metal Me is bivalent, $0.6 < m < 3.0$ and $0 \leq n < 1.5$, and when metal Me is trivalent, $0.9 < m < 4.5$ and $0 \leq n < 1.5$. If the composition is outside these ranges, it will not form single phase α-sialon.

The inter-ionic distance of lanthanide metal Re1 which substitutes a part or all of such metal Me for activation and which will be the emission center, is at least about 5 Å, which is far larger than from 3 to 4 Å in a conventional phosphor. This is believed to be a reason why it is possible to suppress the remarkable decrease of the emission intensity due to optical loss, which used to result when the concentration of lanthanide metal as the emission center contained in the matrix material, is high.

Further, with the oxynitride phosphor activated by a rare earth element of the present invention, the above-mentioned metal Me can be substituted by lanthanide metal Re2 as a coactivator in addition to lanthanide metal Re1 to be the emission center. The coactivating effects of lanthanide metal Re2 as such a coactivator, are considered to be two fold. One is a sensitizing effect, and the other is an effect to form a trap level of a carrier anew thereby to have high persistence developed or improved, or to have thermoluminescence improved. The amount of such lanthanide metal Re2 to be substituted is usually $0.0 \leq z < 0.1$ in the above formula, since it is a coactivator.

Further, the oxynitride phosphor activated by a rare earth element of the present invention is one comprising α-sialon as the matrix material and thus is essentially different in the composition and the crystal structure from a phosphor comprising β-sialon as the matrix material.

Namely, β-sialon is represented by the formula $Si_{6-z}Al_zO_zN_{8-z}$ ($0 < z < 4.2$) and is a solid solution of β-type silicon nitride, wherein a part of Si sites is substituted by Al and a part of N sites is substituted by O.

Whereas, α-sialon is represented by the formula $Me_xSi_{12-(m+n)}Al_{(m+n)}O_nN_{16-n}$ and is a solid solution of α-type silicon nitride wherein a part of Si—N bonds is substituted by Al—N bonds, and certain specific metal Me (Me is at least one metal selected from the group consisting of Ca, Mg, Y and lanthanide metals excluding La and Ce) is incorporated into interstitial sites to form the solid solution.

Thus, the two are different in the solid solution state, i.e. β-sialon has a high oxygen content, and α-sialon has a high nitrogen content.

In a phosphor prepared by adding at least one of oxides of rare earth metals such as Ce, Pr, Eu, Tb, Yb and Er which will be the emission center, to β-sialon as the matrix material, such metals are not soluble in α-sialon, whereby it will be a mixed material wherein a compound containing such a rare earth metal is formed among β-sialon particles.

Whereas, when α-sialon is used as the matrix material, metal Me (where Me is at least one metal selected from the group consisting of Ca, Mg, Y and lanthanide metals excluding La and Ce) is dissolved in its crystal structure, and rare earth elements such as Ce, Pr, Eu, Tb, Yb and Er which will be the emission center, will partly substitute the metal Me sites, whereby an oxynitride phosphor composed of a single phase of an α-sialon structure, can be obtained.

Accordingly, a phosphor obtained by using β-sialon as the matrix material and a phosphor obtained by using α-sialon as the matrix material are totally different in the composition and the crystal structure, and such differences are reflected to the emission characteristics of the phosphors.

Figure 2:
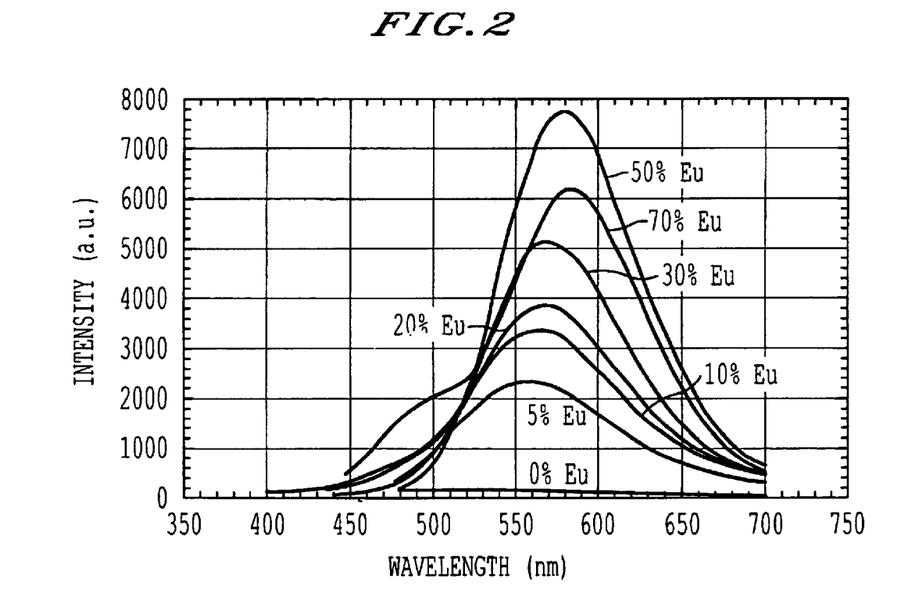
FIG. 2 is a chart showing emission spectra of a Ca-α-sialon phosphor wherein the activating amount of $Eu^{2+}$ ions was changed.

Namely, when β-sialon is used as the matrix material, the luminescent color of phosphors prepared by doping Er oxide to β-sialon as disclosed in Examples 33 to 35 in the above-mentioned JP-A-60-206889, is blue (410 to 440 nm). Whereas, with the oxynitride phosphor activated by a rare earth element of the present invention, the luminescent color activated by the same Er is from orange to red (570 to 590 nm), as shown in FIG. 2 and Example 1 given hereinafter. From this phenomenon, it is considered that Er is taken into the crystal structure of α-sialon, whereby Er will receive an influence of nitrogen atoms constituting the crystal, and elongation of the wavelength in the emission spectrum, which can hardly be realized with the phosphor using an oxide as the matrix material, can be facilitated.

Further, since the matrix material is α-sialon, the oxynitride phosphor activated by a rare earth element of the present invention, also has merits of α-sialon as the matrix material.

Namely, α-sialon is excellent in thermal and mechanical properties and capable of suppressing a thermal relaxation phenomenon which causes a loss of excitation energy. Accordingly, with the oxynitride phosphor activated by a rare earth element of the present invention, the degree of decrease in the emission intensity with an increase of the temperature, will be small. Accordingly, the useful temperature range will be broadened as compared with conventional phosphors.

Further, α-sialon is excellent also in the chemical stability, and accordingly, it will be a phosphor excellent in light resistance.

Further, the oxynitride phosphor activated by a rare earth element of the present invention can be made to be excited by ultraviolet rays, X-rays or electron beams, by selecting the O/N ratio in the composition or the type of lanthanide metal Re1 to be substituted for metal Me and by the presence or absence of lanthanide metal Re2 as a coactivator.

Especially, among oxynitride phosphors activated by rare earth elements of the present invention, one wherein m=1.5, n=0.75 and in the composition formula $Me_xSi_{9.75}Al_{2.25}O_{0.75}N_{15.25}:Re1_yRe2_z$, $0.3<x+y<0.75$ and $0.01<y+z<0.7$ (where $y>0.01$ and $0.0\leq z<0.1$), or $0.3<x+y+z<1.5$, $0.01<y<0.7$ and $0.0\leq z<0.1$, and metal Me is Ca, is particularly excellent in the emission characteristics and is expected to be applied not only to phosphors to be excited by ultraviolet-visible light, but also to phosphors to be excited by electron beams.

Thus, the oxynitride phosphor activated by a rare earth element of the present invention is useful particularly for the preparation of white LED and is a phosphor suitable for InGaN type blue LED as a light source.

Now, the second aspect of the present invention will be described.

As a result of an extensive study on the compositional range for high emission efficiency on the basis of the above technical finding, the present invention have found a mixed material comprising α-sialon having a part of Ca sites of α-sialon substituted by at least one of rare earth metals (M) (where M is Eu, Tb, Yb or Er), β-sialon and unreacted silicon nitride, and having characteristics equal to α-sialon alone, and the second aspect of the present invention which makes high luminance white LED possible has been accomplished.

In the second aspect of the present invention, a phosphor can be prepared by adding a rare earth metal in an amount smaller than the amount required for the phosphor of the first aspect of the present invention, which is useful for reducing the cost of the material.

Further, the matrix material is α-sialon, and the sialon type phosphor activated by the rare earth element of the second aspect of the present invention, also has merits of α-sialon as the matrix material and is excellent in chemical, mechanical and thermal characteristics and stable as a phosphor material and expected to have a long useful life. Further, it is excellent in the above characteristics and is capable of suppressing a thermal relaxation phenomenon which causes a loss of the excitation energy. Accordingly, with α-sialon having a rare earth element in the solid solution together with Ca according to the second aspect of the present invention, the degree of decrease in the emission intensity with an increase of the temperature, will be small. Accordingly, the useful temperature range will be broadened as compared with conventional phosphors.

Further, the α-sialon phosphor dissolving Ca and a rare earth element according to the second aspect of the present invention, can be made to be excited by ultraviolet rays, X-rays or electron beams by selecting the O/N ratio in the composition formula or by selecting the type of metal M.

Namely, in the second aspect, the present invention provides a material showing emission characteristics equal to the first aspect of the present invention even if the amount of rare earth metals (such as Eu, Tb, Yb and Er) to be added, is reduced. In order to stabilize the α-sialon structure, solid solution of elements in an amount of at least a prescribed level, is required. When the solid solution amounts of Ca and a trivalent metal are represented by x and y, respectively, the value (x+y) is required to be at least 0.3 in a thermodynamic equilibrium state.

In the second aspect of the present invention, the phosphor is made of a material having a composition which comprises not only α-sialon but also β-sialon or unreacted silicon nitride, for a reason of either addition in an amount smaller than the prescribed amount or not reaching the thermodynamical equilibrium.

In the chemical composition of the powder, the amounts of metals added in the phosphor of the present invention are within the ranges of $0.05<(x+y)<0.3$, $0.02<x<0.27$ and $0.03<y<0.3$. If the amounts added are lower then the above lower limits, the amount of α-sialon decreases, whereby the emission intensity decreases. If the amounts added exceed the above upper limits, the material tends to be α-sialon only, and the object of the second aspect of the present invention can not be accomplished as the amounts added are too much. If the amounts added are within the ranges of the above formulae, it is possible to obtain a sialon type phosphor comprising at least 40 wt % of α-sialon, at most 40 wt % of β-sialon and at most 30 wt % of unreacted silicon nitride. Despite the presence of unreacted silicon nitride, the emission intensity is high, for such a reason that α-sialon epitaxially grows on silicon nitride, and mainly the surface portion responds to the excitation light, whereby characteristics substantially close to single α-sialon can be obtained.

The phosphor of the present invention can be obtained by heating a mixed powder of $Si_3N_4$—$M_2O_3$—CaO—AlN—$Al_2O_3$ system in an inert gas atmosphere within a range of from 1,650 to 1,900° C. to obtain a sintered product and pulverizing the sintered product. CaO is unstable and readily reacts with steam in air. Accordingly, it is common that it is added in the form of calcium carbonate or calcium hydroxide, and it will be converted to CaO in the process of heating at a high temperature.

If the total chemical composition of the phosphor of the second aspect of the present invention is described by the composition ranges of M-α-sialon, Ca-α-sialon and β-sialon, it is within a range defined by three compositional lines of $Si_3N_4$-a($M_2O_3$.9AlN), $Si_3N_4$-b(CaO.3AlN) and $Si_3N_4$-c(AlN.$Al_2O_3$), where $4\times10^{-3}<a<4\times10^{-2}$, $8\times10^{-3}<b<8\times10^{-2}$ and $10^{-2}<c<10^{-1}$.

Figure 9:
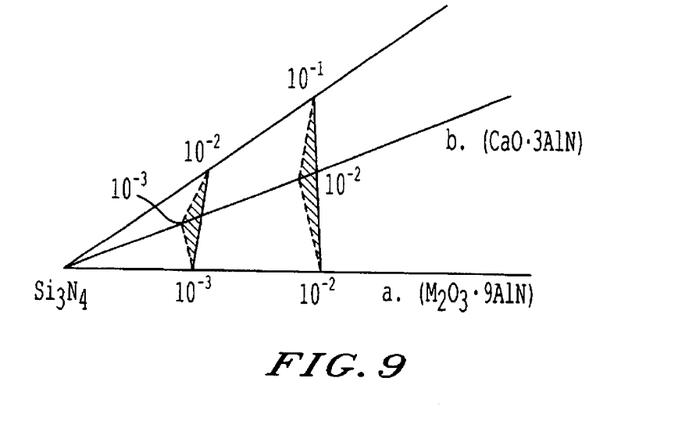
FIG. 9 is a composition diagram showing the chemical composition range (the composition range between the hatched two triangles) of the phosphor according to the second aspect of the present invention and the chemical composition range of the powder as a whole.

As represented by the compositional region of a triangular pyramid having silicon nitride at the apex, the phosphor of the present invention falls within the composition range between the two triangles, as shown in FIG. 9. The amount of solid solution within the actually formed α-sialon particles is x+y<0.3 i.e. the amount required for stabilization, as mentioned above. Within a composition range where the amount added is less than this level, the product will be constituted by α-sialon having a composition of (x+y)<0.3, β-sialon dissolving no rare earth and unreacted silicon nitride. It is common that additionally a small amount (not more than 5 wt %) of a glass phase will be co-existent.

According to the second aspect of the present invention, even if the amount of a rare earth added is small, and the composition is not α-sialon alone, α-sialon will form on the surface of particles, whereby the emission characteristics are excellent, and such a product is expected to be applicable not only to an ultraviolet-visible light excitation phosphor but also to an electron beam excitation phosphor.

Thus, the composite sintered product containing Ca-α-sialon dissolving a rare earth simultaneously, according to the present invention, is effective for practical use of white LED.

Now, the present invention will be described in further detail with reference to Examples. However, it should be understood that the present invention is by no means restricted to such specific Examples.

Oxynitride phosphors activated by rare earth elements were reacted for one hour in a nitrogen atmosphere of 1 atm at 1,700° C. under a pressure of 20 MPa by means of a hot press apparatus, to prepare eight types of material powders, as shown below. The molar ratios of chemical regents used as starting materials for these materials are also shown below.

① Ca-α-sialon ($Ca_{0.75}Si_{9.75}Al_{2.25}N_{15.25}O_{0.75}$) Silicon nitride ($Si_3N_4$): aluminum nitride (AlN):calcium oxide (CaO)=13:9:3

② Eu-α-sialon ($Eu_{0.5}Si_{9.75}Al_{2.25}N_{15.25}O_{0.75}$) Silicon nitride ($Si_3N_4$):aluminum nitride (AlN) europium oxide ($Eu_2O_3$)=13:9:1

③ Pr-α-sialon ($Pr_{0.5}Si_{9.76}Al_{2.25}N_{15.25}O_{0.75}$) Silicon nitride ($Si_3N_4$):aluminum nitride (AlN):praseodium oxide ($Pr_6O_{11}$)=30:27:1

④ Tb-α-sialon ($Tb_{0.5}Si_{9.75}Al_{2.25}N_{15.25}O_{0.75}$) Silicon nitride ($Si_3N_4$):aluminum nitride (AlN):terbium oxide ($Tb_4O_7$)=26:18:1

⑤ Dy-α-sialon ($Dy_{0.5}Si_{9.75}Al_{2.25}N_{15.25}O_{0.75}$) Silicon nitride ($Si_3N_4$):aluminum nitride (AlN):dysprosium oxide ($Dy_2O_3$)=13:9:1

⑥ Y-α-sialon ($Y_{0.5}Si_{9.75}Al_{2.25}N_{15.25}O_{0.75}$) Silicon nitride ($Si_3N_4$):aluminum nitride (AlN):dysprosium oxide ($Dy_2O_3$)=13:9:1

⑦ Yb-α-sialon ($Yb_{0.5}Si_{9.75}Al_{2.25}N_{5.25}O_{0.75}$) Silicon nitride ($Si_3N_4$):aluminum nitride (AlN):ytterbium oxide ($Yb_2O_3$)=13:9:1

⑧ Er-α-sialon ($Er_{0.5}Si_{9.75}Al_{2.25}N_{15.25}O_{0.75}$) Silicon nitride ($Si_3N_4$):aluminum nitride (AlN):erbium oxide ($Er_2O_3$)=13:9:1

EXAMPLE 1

Using the above material powders ① and ②, seven types of Ca-α-sialon phosphors were prepared in which the activating amount of $Eu^{2+}$ ions was varied. The preparation conditions were such that the material powders were mixed in the following molar ratio and reacted for one hour in a nitrogen atmosphere of 1 atm at 1,700° C. under a pressure of 20 MPa by means of a hot press apparatus.

(1) Ca(0% Eu)-α-sialon phosphor ($Ca_{0.75}Si_{9.75}Al_{2.25}N_{15.25}O_{0.75}$)
① Ca-α-sialon alone.

(2) Ca(5% Eu)-α-sialon phosphor ($Ca_{0.71}Eu_{0.025}Si_{9.75}Al_{2.25}N_{15.25}O_{0.75}$)
① Ca-α-sialon: ② Eu-α-sialon=95:5

(3) Ca(10% Eu)-α-sialon phosphor ($Ca_{0.68}Eu_{0.05}Si_{9.75}Al_{2.25}N_{15.25}O_{0.75}$)
① Ca-α-sialon: ② Eu-α-sialon=90:10

(4) Ca(20% Eu)-α-sialon phosphor ($Ca_{0.60}Eu_{0.10}Si_{9.75}Al_{2.25}N_{5.25}O_{0.75}$)
① Ca-α-sialon: ② Eu-α-sialon=80:20

(5) Ca(30% Eu)-α-sialon phosphor ($Ca_{0.53}Eu_{0.15}Si_{9.75}Al_{2.25}N_{16.25}O_{0.75}$)
① Ca-α-sialon: ② Eu-α-sialon=70:30

(6) Ca(50% Eu)-α-sialon phosphor ($Ca_{0.38}Eu_{0.25}Si_{9.75}Al_{2.25}N_{15.25}O_{0.75}$)
① Ca-α-sialon: ② Eu-α-sialon=50:50

(7) Ca(70% Eu)-α-sialon phosphor ($Ca_{0.23}Eu_{0.35}Si_{9.75}Al_{2.25}N_{15.25}O_{0.75}$)
① Ca-α-sialon: ② Eu-α-sialon=30:70

Figure 1:
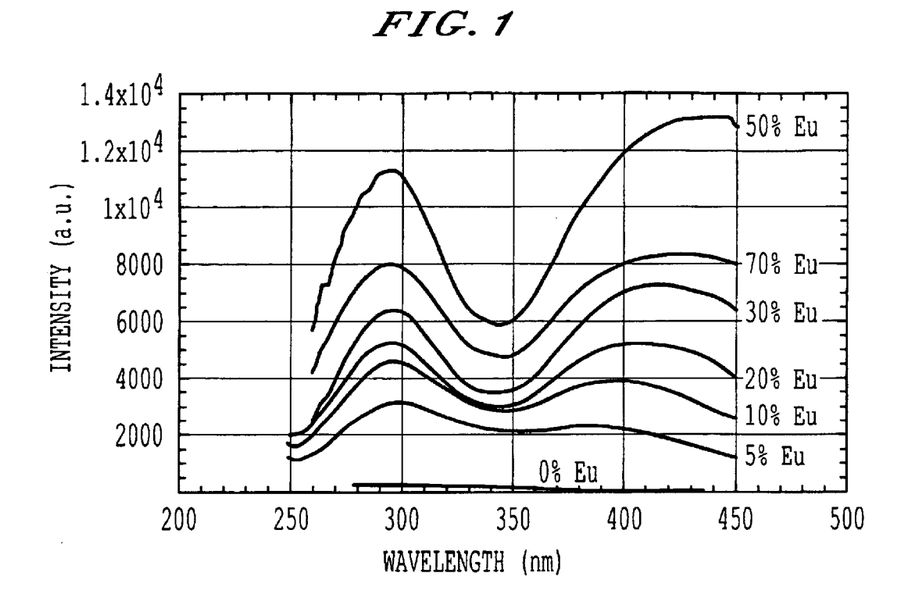
FIG. 1 is a chart showing excitation spectra relating to red emission of a Ca-α-sialon phosphor wherein the activating amount of $Eu^{2+}$ ions was changed.

FIG. 1 is a chart showing spectra relating to red emission of these phosphors (1) to (7).

In the excitation spectrum of each phosphor, broad peaks are observed at 280 nm and at 400 to 450 nm. These two peaks show an increase of the peak intensity with an increase of the activating amount until the proportion of $Eu^{2+}$ ions doped, reaches 50%. If the activating amount exceeds 50%, a decrease in the peak intensity occurs due to optical loss by concentration, but even then, the peak intensity is still higher than when the activating amount is 30%.

Of the two peaks observed in the excitation spectrum, the peak at 280 nm belongs to a peak attributable to the excitation of Ca-α-sialon as the matrix material, and the peak at 400 to 450 nm belongs to the charge transfer absorption band of Eu—(N or O). The latter peak shifts towards a long wavelength side as the activating amount of $Eu^{2+}$ ions increases, and such is useful as an excitation light (450 to 550 nm) of InGaN type blue LED.

FIG. 2 is a chart showing emission spectra of Ca-α sialon phosphors in which the amount of $Eu^{2+}$ ions was varied.

The observed peak was only one, and this peak shifted continuously from 560 nm to 590 nm with an increase of the amount of $Eu^{2+}$ ions. Also in such emission spectra, like the excitation spectra shown in FIG. 1, the maximum intensity of the peak was observed when the activating amount of $Eu^{2+}$ ions was 50%, and if the amount exceeds 50%, a decrease in the peak intensity occurred due to optical loss by concentration, but even then, the peak intensity was still higher than when the activating amount was 30%.

As mentioned above, the above Ca-α-sialon phosphors have such $Eu^{2+}$ ion activating amounts, as the distances among $Eu^{2+}$ ions doped are apart by about 5 Å from one another.

EXAMPLE 2

Material powders were mixed in a molar ratio of ① Ca-α-sialon: ② Pr-α-sialon=50:50. This mixed powder was reacted for one hour in a nitrogen atmosphere of 1 atm at 1,700° C. under a pressure of 20 MPa by means of a hot press apparatus to obtain a Ca-α-sialon phosphor activated by $Pr^{3+}$ ions ($Ca_{0.38}Pr_{0.25}Si_{9.75}Al_{2.25}N_{15.25}O_{0.75}$)

Figure 3A:
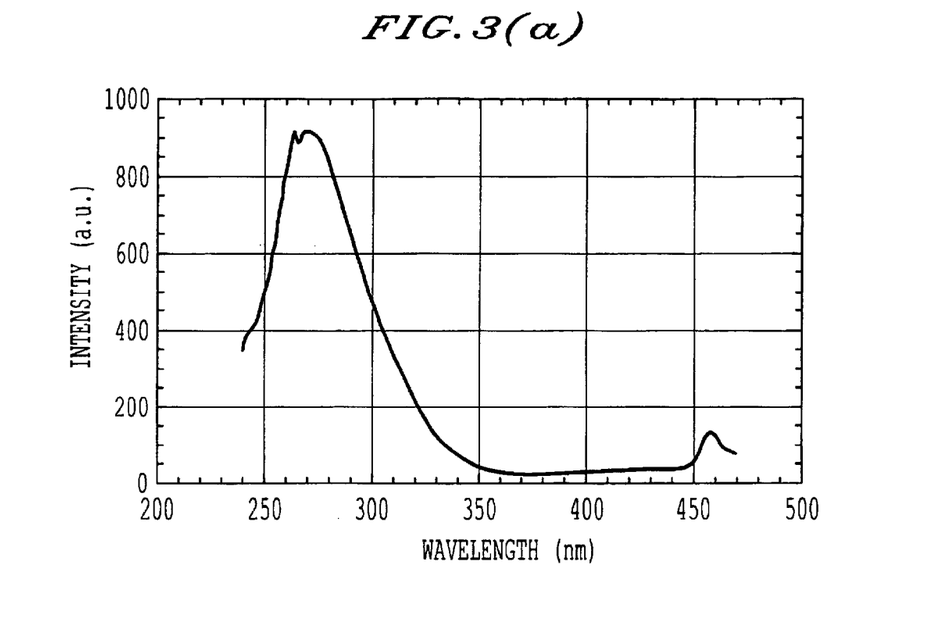
FIG. 3(a) is a chart showing an excitation spectrum of a Ca-α-sialon phosphor activated by $Pr^{3+}$ ions.
Figure 3B:
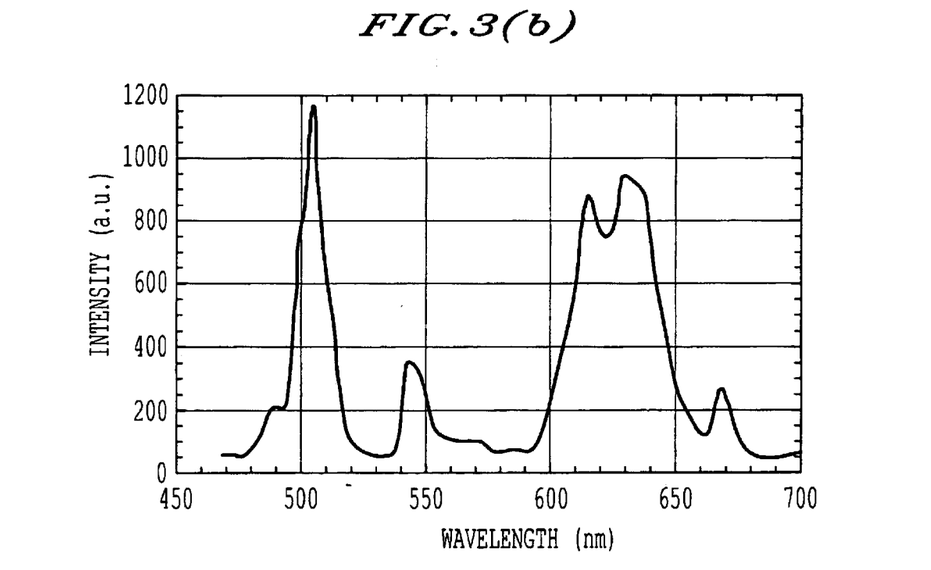
FIG. 3(b) is a chart showing an emission spectrum of a Ca-α-sialon phosphor activated by $Pr^{3+}$ ions.

FIGS. 3(a) and 3(b) are charts showing the excitation spectrum and the emission spectrum, respectively, of the Ca-α-sialon phosphor activated by $Pr^{3+}$ ions.

In the excitation spectrum, a broad peak was observed at 263 nm, and a brightline peak attributable to the f—f transition of $Pr^{3+}$ ions was observed in the vicinity of 460 nm. In the emission spectrum, brightline peaks attributable to the f—f transition of $Pr^{3+}$ ions were observed from 450 to 750 nm.

EXAMPLE 3

Material powders were mixed in a molar ratio of ① Ca-α-sialon: ④ Tb-α-sialon=50:50. This mixed powder was reacted for one hour in a nitrogen atmosphere of 1 atm at 1,700° C. under a pressure of 20 MPa by means of a hot press apparatus to obtain a Ca-α-sialon phosphor activated by $Tb^{3+}$ ions ($Ca_{0.38}Tb_{0.25}Si_{9.75}Al_{2.25}N_{15.26}O_{0.75}$).

Figure 4A:
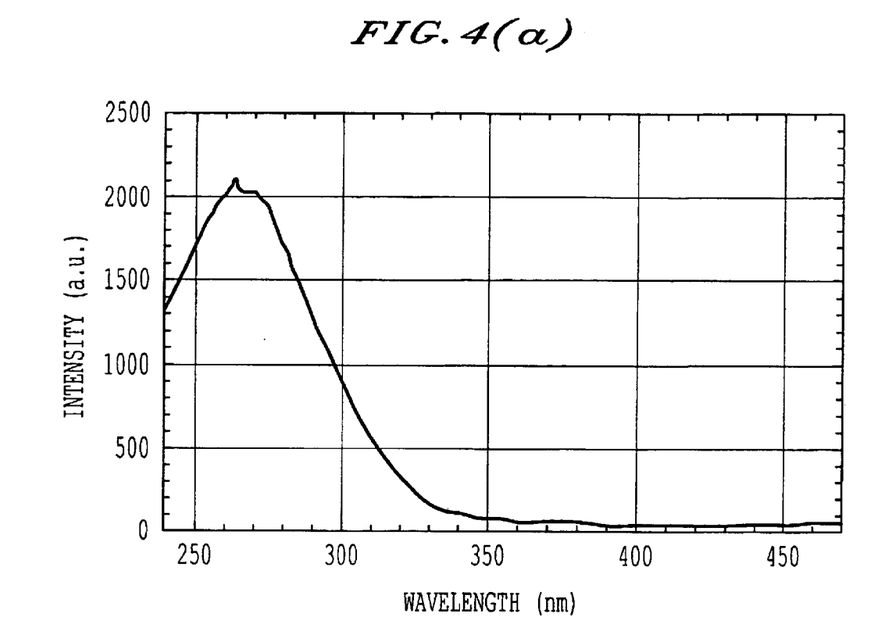
FIG. 4(a) is a chart showing an excitation spectrum of a Ca-α-sialon phosphor activated by $Tb^{3+}$ ions.
Figure 4B:
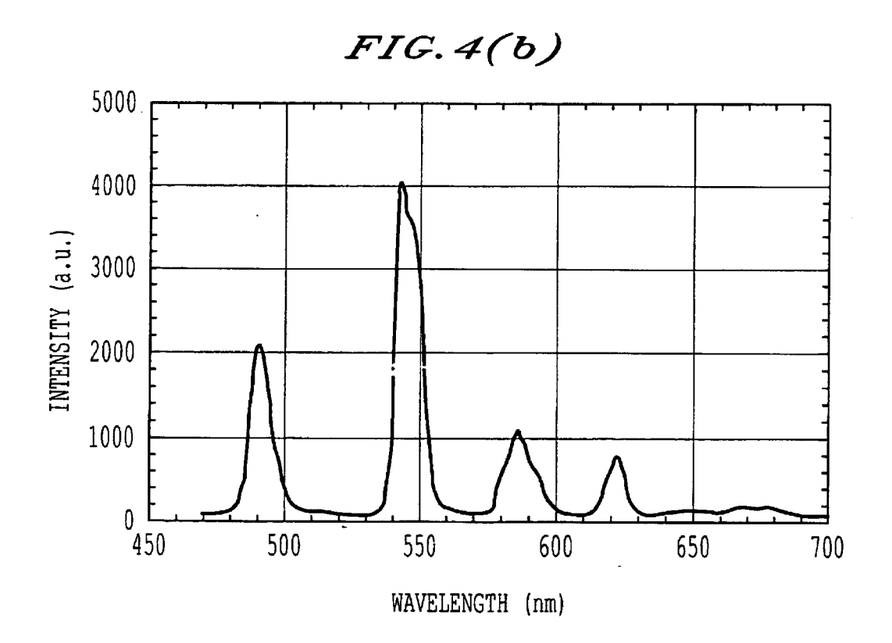
FIG. 4(b) is a chart showing an emission spectrum of a Ca-α-sialon phosphor activated by $Tb^{3+}$ ions.

FIGS. 4(a) and 4(b) are charts showing the excitation spectrum and the emission spectrum, respectively, of the Ca-α-sialon phosphor activated by $Tb^{3+}$ ions.

In the excitation spectrum, a broad peak was observed at 263 nm. In the emission spectrum, brightline peaks attributable to the f—f transition of $Tb^{3+}$ ions were observed from 470 to 650 nm. Such brightline peaks were observed as a green light emission, with the maximum at 550 nm.

EXAMPLE 4

Material powders were mixed in a molar ratio of ① Ca-α-sialon: ② Eu-α-sialon: ⑤ Dy-α-sialon=50:40:10. This mixed powder was reacted for one hour in a nitrogen atmosphere of 1 atm at 1,700° C. under a pressure of 20 MPa by means of a hot press apparatus to obtain a phosphor ($Ca_{0.38}Eu_{0.20}Dy_{0.05}Si_{9.75}Al_{2.25}N_{15.25}O_{0.75}$) having the Ca-α-sialon phosphor activated by $Eu^{3+}$ ions, further co-activated by $Dy^{3+}$ ions.

Figure 5A:
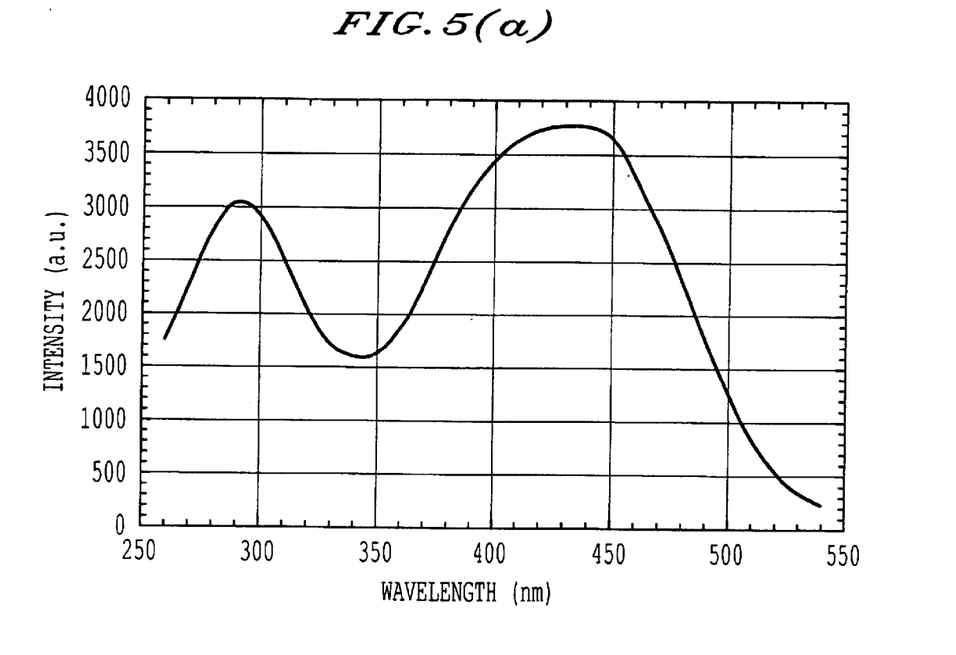
FIG. 5(a) is a chart showing an excitation spectrum of a Ca-α-sialon phosphor activated by both $Eu^{2+}$ ions and $Dy^{3+}$ ions.
Figure 5B:
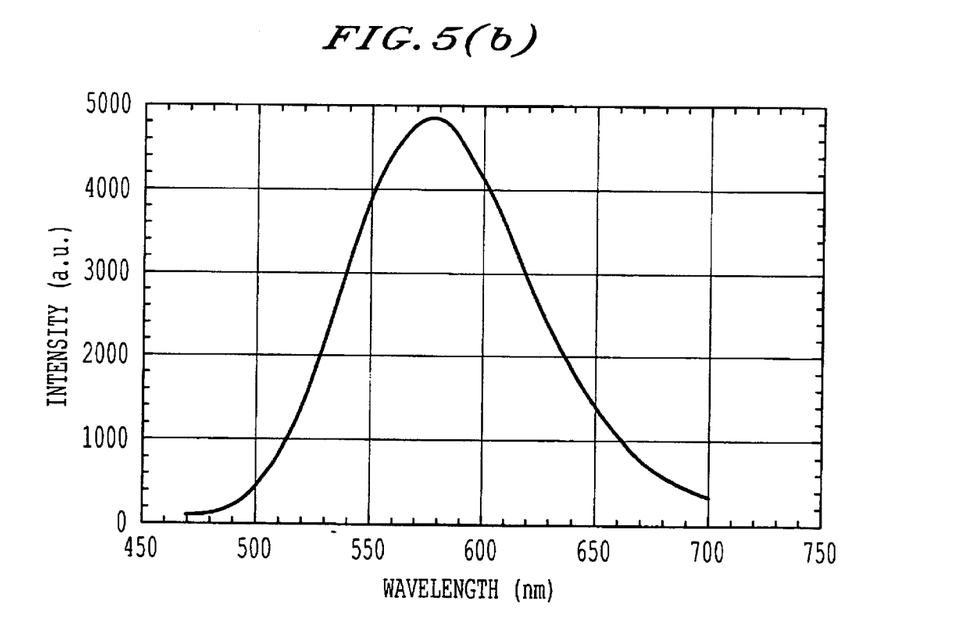
FIG. 5(b) is a chart showing an emission spectrum of a Ca-α-sialon phosphor activated by both $Eu^{2+}$ ions and $Dy^{3+}$ ions.

FIGS. 5(a) and 5(b) are charts showing the excitation spectrum and the emission spectrum, respectively, of the Ca-α-sialon phosphor co-activated by $Eu^{3+}$ ions and $Dy^{3+}$ ions.

In the excitation spectrum, two broad peaks were observed at 290 nm and 450 nm. Of the two peaks, the peak at 290 nm belongs to a peak attributable to the excitation of Ca-α-sialon as the matrix material, and the peak at 450 nm belongs to the charge transfer absorption band of Eu—(N, O). The peak observed in the emission spectrum is only one, and this peak is attributable to the d-f transition of $Eu^{2+}$ ions.

EXAMPLE 5

Material powders were mixed in a molar ratio of ⑥ Yα-sialon: ② Eu-α-sialon=95:5. This mixed powder was reacted for one hour in a nitrogen atmosphere of 1 atm at 1,700° C. under a pressure of 20 MPa by means of a hot press apparatus to obtain a Y-α-sialon phosphor activated by $Eu^{3+}$ ions ($Y_{0.38}Eu_{0.02}Si_{9.75}Al_{2.25}N_{15.25}O_{0.75}$)

Figure 6A:
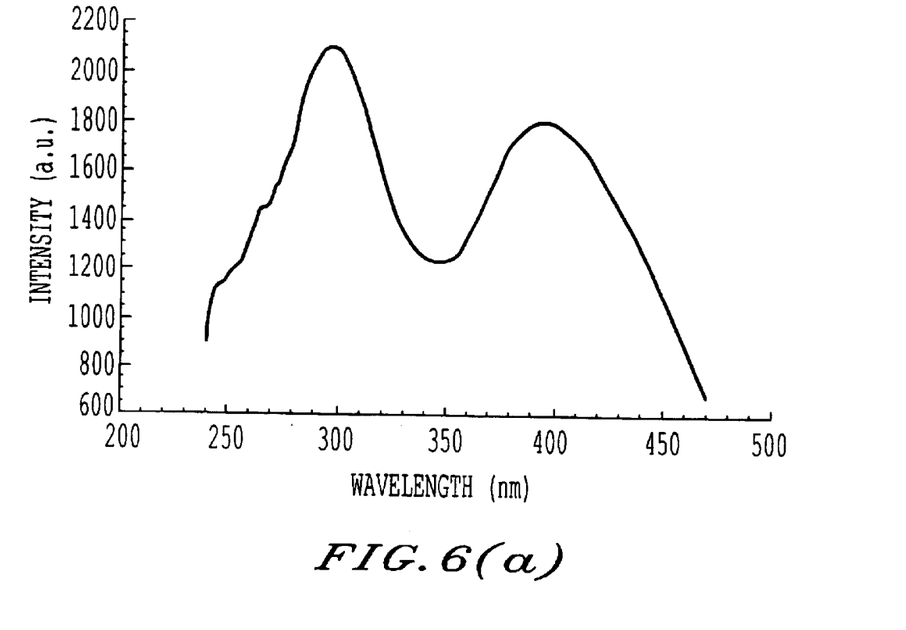
FIG. 6(a) is a chart showing an excitation spectrum of a Y-α-sialon phosphor activated by $Eu^{3+}$ ions.
Figure 6B:
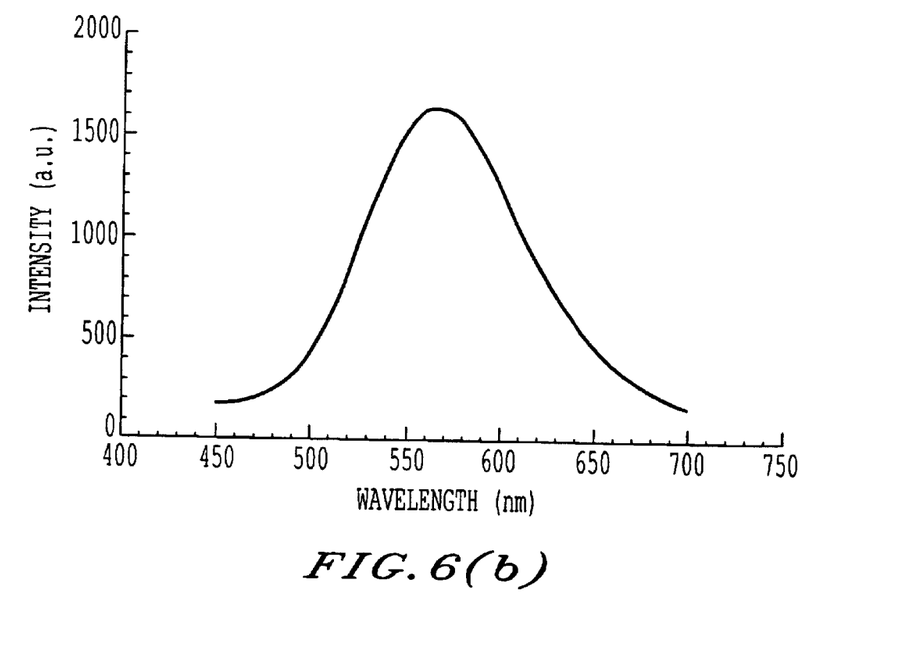
FIG. 6(b) is a chart showing an emission spectrum of a Y-α-sialon phosphor activated by $Eu^{3+}$ ions.

FIGS. 6(a) and 6(b) are charts showing the excitation spectrum and the emission spectrum, respectively, of the Y-α-sialon phosphor activated by $Eu^{2+}$ ions.

In the excitation spectrum, two broad peaks were observed at 310 nm and 410 nm. In the emission spectrum, a peak was observed at 570 nm, and this peak is attributable to the d-f transition of $Eu^{2+}$ ions.

EXAMPLE 6

The above ⑦ $Yb^{2+}$ α-sialon ($Yb_{0.5}Si_{9.75}Al_{2.25}N_{15.25}O_{0.75}$) was used by itself as a phosphor.

Figure 7:
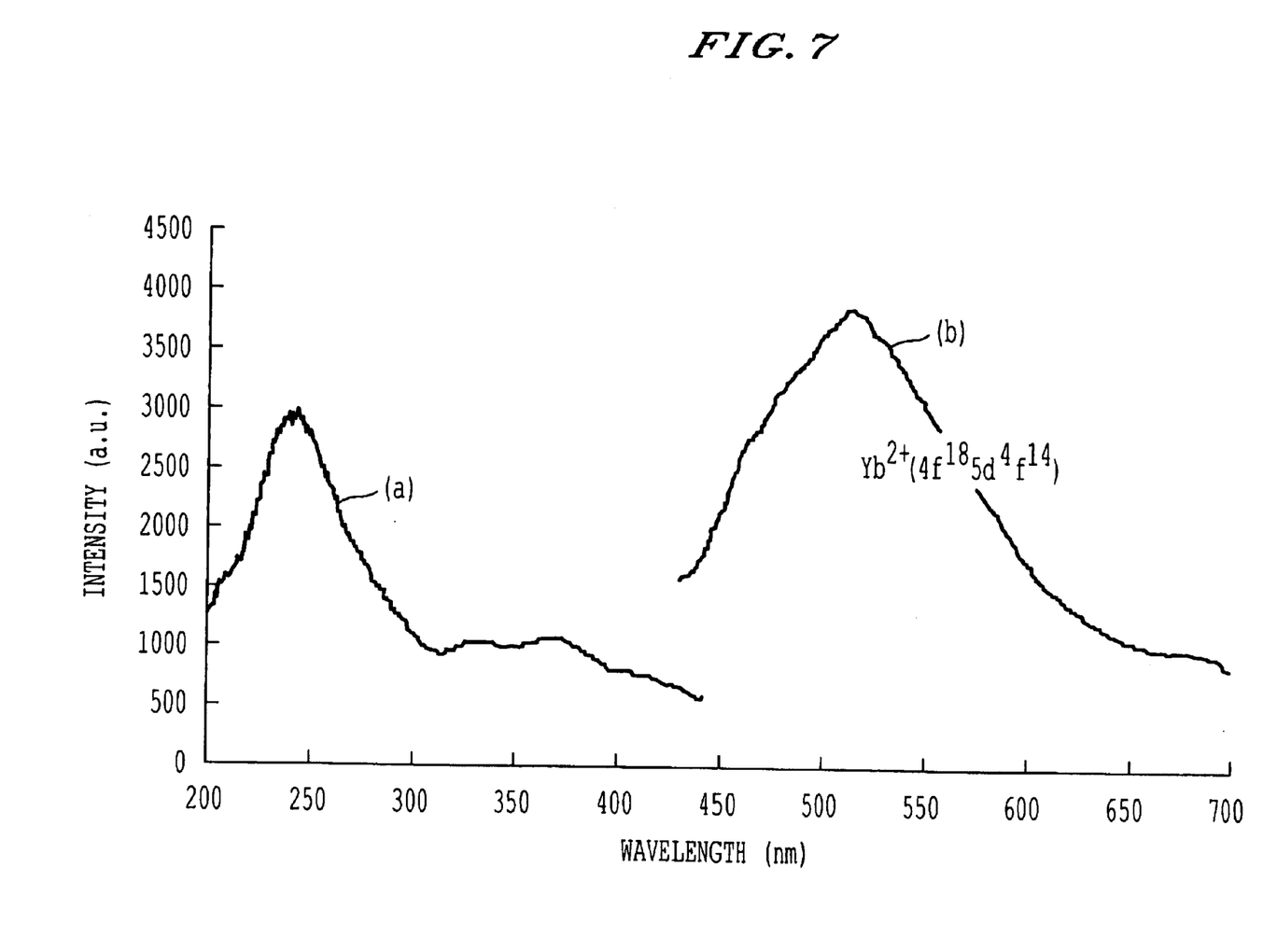
FIG. 7 is a chart showing an excitation spectrum (a) and an emission spectrum (b) of a $Yb^{2+}$ α-sialon phosphor.

In FIG. 7, (a) and (b) are charts showing the excitation spectrum and the emission spectrum, respectively, of the $Yb^{2+}$ α-sialon phosphor.

In the excitation spectrum, a broad peak was observed at about 240 nm. In the emission spectrum, a peak was observed at 510 nm, and this peak is attributable to the d-f transition of $Yb^{2+}$ ions.

EXAMPLE 7

The above ⑧ Eu-α-sialon ($Er_{0.5}Si_{9.75}Al_{2.25}N_{15.25}O_{0.75}$) was used by itself as a phosphor.

Figure 8:
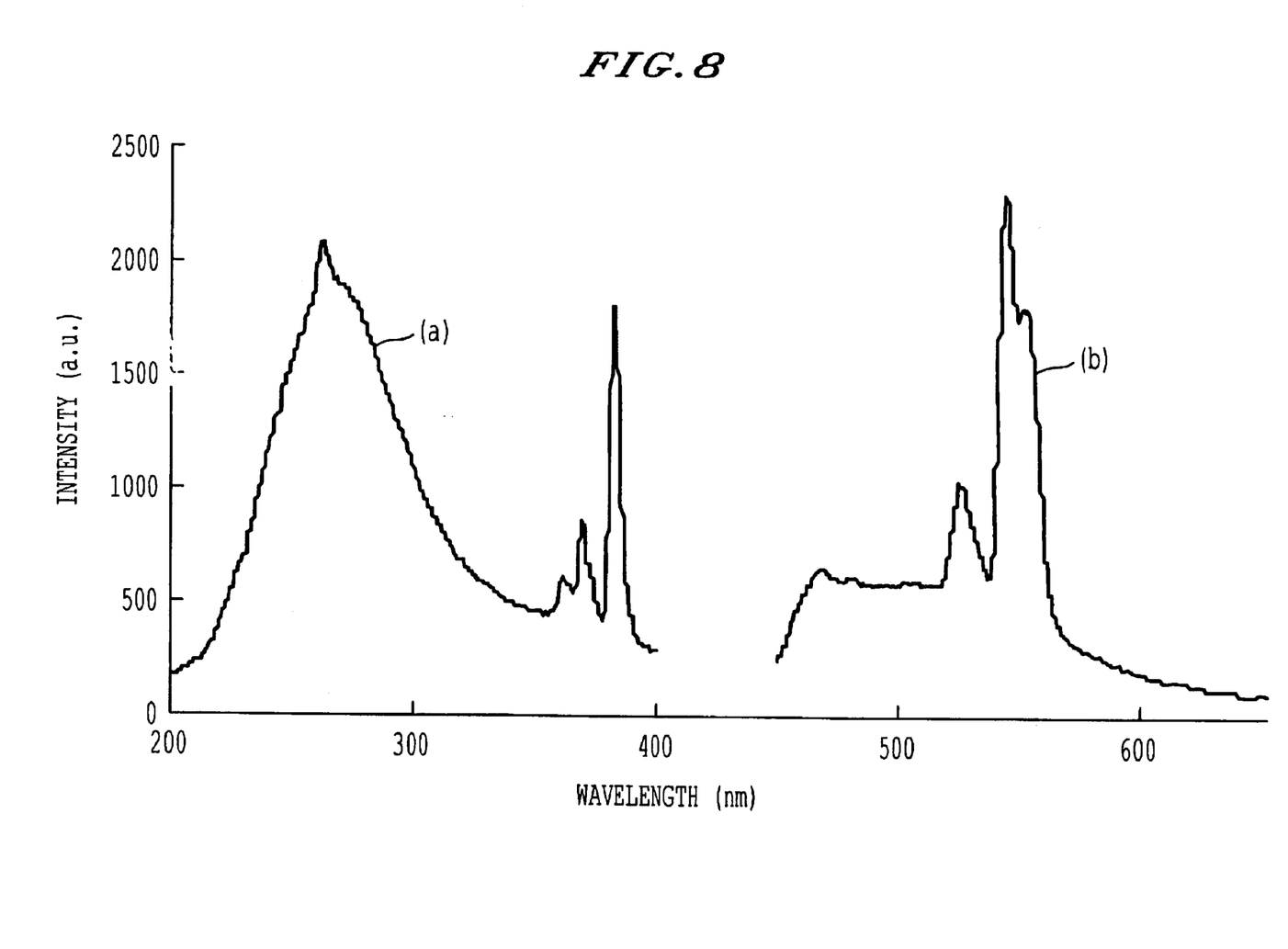
FIG. 8 is a chart showing an excitation spectrum (a) and an emission spectrum (b) of an $Eu^{3+}$ α-sialon phosphor.

In FIG. 8, (a) and (b) are charts showing the excitation spectrum and the emission spectrum, respectively, of the $Er^{3+}$ α-sialon phosphor.

In the excitation spectrum, a broad peak was observed at 263 nm, and brightline peaks attributable to the f—f transition of $Er^{3+}$ ions were observed in the vicinity of 400 nm. In the emission spectrum, brightline peaks attributable to the f—f transition of $Er^{3+}$ ions were observed from 500 to 600 nm.

Now, the second aspect of the present invention will be described in further detail with reference to Examples.

EXAMPLE 8

A mixture of $Si_3N_4:Eu_2O_3:CaO:AlN=79.0:1.5:2.2:15.8$ (molar ratio) (provided that CaO was added in the form of calcium carbonate) was compacted under a pressure of 200 kg/cm² by a mold having a diameter of 10 mm and then subjected to hot press sintering under a pressure of 20 MPa for one hour at 1,750° C. in a nitrogen atmosphere. After the heating, the sintered product was pulverized, and the powder X-ray diffraction was measured, whereby a material comprising 66 wt % of α-sialon, 18 wt % of β-sialon and 15 wt % of unreacted α-silicon nitride, was obtained.

Figure 10:
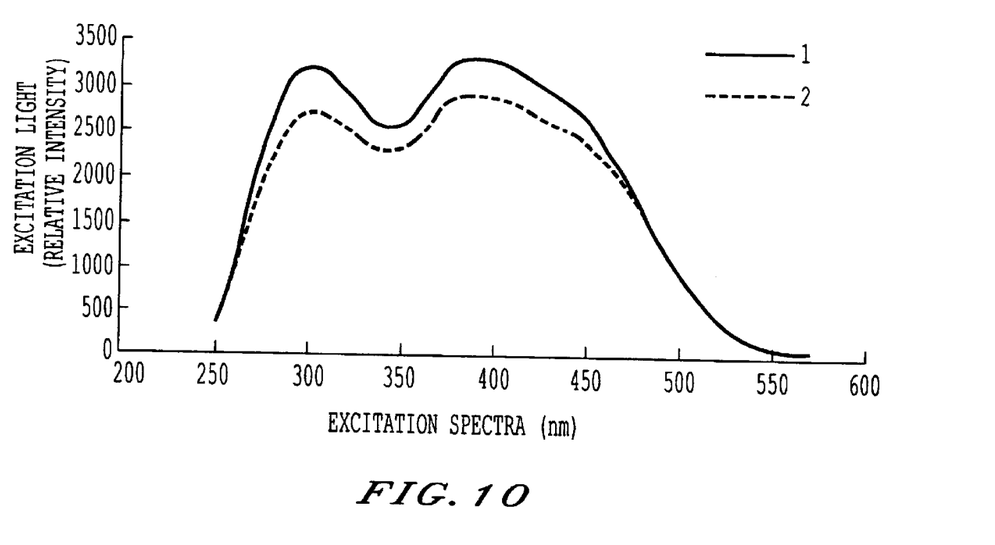
FIG. 10 is a graph showing excitation spectra of Example 8 (solid line) and Example 9 (dotted line).
Figure 11:
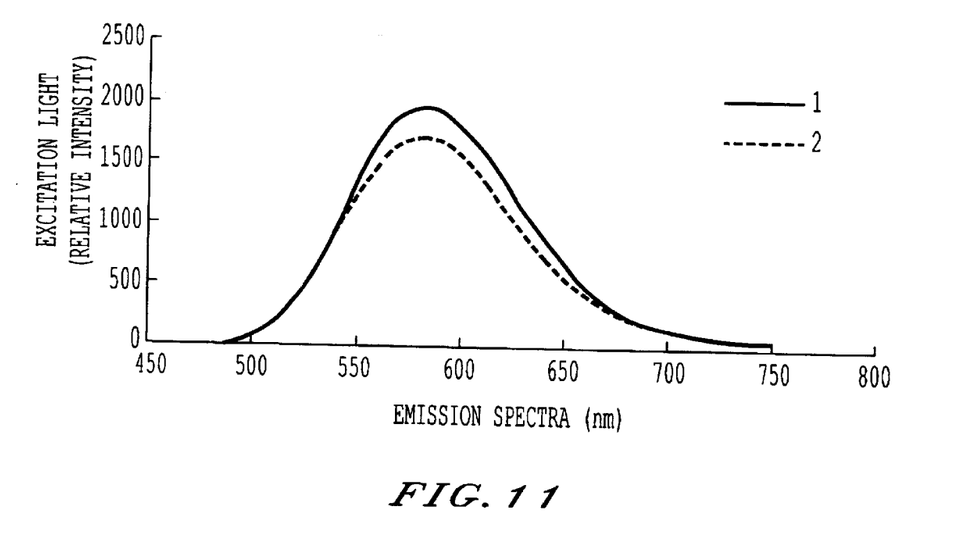
FIG. 11 is a graph showing emission spectra of Example 8 (solid line 1) and Example 9 (dotted line 2).

If the composition of the powder as a whole is represented by a composition formula of α-sialon, it will be $(Ca_{0.11}Eu_{0.14})(Si,Al)_{12}(O,N)_{16}$. The excitation spectrum of the material is shown by solid line 1 in FIG. 10, wherein the peak at about 300 nm is attributable to excitation of the Ca-α-sialon as the matrix material, and the peak at 350 to 500 nm belongs to the charge transfer absorption band of Eu—(O,N), which indicates that InGaN type blue LED (450 to 500 nm) can be used as an excitation light. The emission spectrum is shown by solid line 1 in FIG. 11 and has a peak in the vicinity of 580 nm.

EXAMPLE 9

A mixture of $Si_3N_4:Eu_2O_3:CaO:AlN:Al_2O_3=$ 75.9:1.0:3.2:17.2:1.72 (molar ratio) (provided that CaO was added in the form of calcium carbonate) was compacted under a pressure of 200 kg/cm² by a mold having a diameter of 10 mm and then heated for two hours at 1,750° C. in an argon atmosphere. After the heating, the sintered product was pulverized, and the powder X-ray diffraction was measured, whereby a material comprising 68 wt % of α-sialon, 24 wt % of β-sialon and 8 wt % of unreacted α-silicon nitride, was obtained. If the composition of the powder as a whole is represented by a composition formula of α-sialon, it will be $(Ca_{0.15},Eu_{0.06})(Si,Al)_{12}(O,N)_{15}$. The material showed an excitation peak at 350 to 500 nm and an emission peak at 550 to 650 nm, as shown by dotted line 2 in FIG. 10 and dotted line 2 in FIG. 11, respectively.

EXAMPLE 10

A mixture of $Si_3N_4:Tb_2O_3:CaO:AlN=79.0:1.5:2.2:15.8$ (molar ratio) (provided that CaO was added in the form of calcium carbonate) was compacted under a pressure of 200 kg/cm² by a mold having a diameter of 10 mm and then heated for two hours at 1,700° C. in a nitrogen atmosphere. After the heating, the sintered product was pulverized, and the powder X-ray diffraction was measured, whereby a material comprising 68 wt % of α-sialon, 16 wt % of β-sialon and 16 wt % of unreacted α-silicon nitride, was obtained. If the composition of the powder as a whole is represented by a composition formula of α-sialon, it will be $(Ca_{0.11},Tb_{0.14})(Si,Al)_{12}(O,N)_{16}$. The material showed a light emission having main peaks at about 400 nm and 540 nm.

EXAMPLE 11

A mixture of $Si_3N_4:Yb_2O_3:CaO:AlN:Al_2O_3=$ 75.9:1.0:3.2:17.2:1.72 (molar ratio) (provided that CaO was added in the form of calcium carbonate) was compacted under a pressure of 200 kg/cm² by a mold having a diameter of 10 mm and then heated for two hours at 1,750° C. in a nitrogen atmosphere. After the heating, the sintered product was pulverized, and the powder X-ray diffraction was measured, whereby a material comprising 70 wt % of α-sialon, 22 wt % of β-sialon and 8 wt % of unreacted α-silicon nitride, was obtained. If the composition of the powder as a whole is represented by a composition formula of α-sialon, it will be $(Ca_{0.15},Yb_{0.06})(Si,Al)_{12}(O,N)_{16}$. The material showed a light emission having a broad peak at 450 to 600 nm.

The present invention is by no means restricted by the above-mentioned embodiments or Examples. With respect to details of preparation of materials, the molar ratios and the production conditions, various changes or modifications are, of course, possible.

As described in detail in the foregoing, with the oxynitride phosphor activated by a rare earth element, of the present invention, the position of its excitation spectrum shifts towards a long wavelength side as compared with conventional oxide phosphors, and the absorption peak overlaps the luminescence (459 to 500 nm) emitted by blue LED. Thus, the present invention provides the oxynitride phosphor activated by a rare earth element, which makes high luminance of white LED possible by using blue LED as a light source.

Further, the oxynitride phosphor activated by a rare earth element of the present invention is excellent in thermal and mechanical properties and further in the chemical stability, since the matrix material is α-sialon. Accordingly, the present invention provides the oxynitride phosphor activated by a rare earth element, which is capable of being operated stably even in a severe environment, i.e. which is excellent in life time.

Likewise, the α-sialon type phosphor of the present invention shifts the excitation spectrum towards a long wavelength side as compared with the conventional oxide phosphors, and the absorption peak overlaps the luminance (450 to 500 nm) of blue LED. Thus, the present invention provides a phosphor which makes high luminance of white LED possible by using blue LED as an excitation light source.

Further, α-sialon has been developed as a heat resistance material and thus has thermal, mechanical and chemical stability. Thus, the present invention provides an α-sialon type phosphor which can be operated stably even in a severe environment and which is excellent in life time.

The entire disclosures of Japanese Patent Application No. 2001-171831 filed on Jun. 7, 2001 and Japanese Patent Application No. 2002-149022 filed on May 23, 2002 including specifications, claims, drawings and summaries are incorporated herein by reference in their entireties.

What is claimed is:

1. A sialon type phosphor in the form of a powder comprising at least 40 wt % of α-sialon represented by the formula $(Ca_x,M_y)(Si,Al)_{12}(O,N)_{16}$ wherein M is at least one metal selected from the group consisting of Eu, Tb, Yb and Er, $0.05<(x+y)<0.3$, $0.02<x<0.27$ and $0.03<y<0.3$, and having a structure such that Ca sites of Ca-α-sialon are partially substituted by other metal M, at most 40 wt % of β-sialon, and at most 30 wt % of unreacted silicon nitride.

2. The sialon type phosphor according to claim 1, wherein the chemical composition of the powder as a whole, is within a range defined by three compositional lines of $Si_3N_4$-a($M_2O_3$.9AlN), $Si_3N_4$-b(CaO.3AlN) and $Si_3N_4$-c (AlN.$Al_2O_3$), where $4\times10^{-3}<a<4\times10^{-2}$, $8\times10^{-3}<b<8\times10^{-2}$ and $10^{-2}<c<10^{-1}$.

* * * * *